Feb. 3, 1931.  M. L. RIVIÉRE  1,791,428
FOLDING SAFETY RAZOR
Filed Aug. 24, 1927  4 Sheets-Sheet 1

INVENTOR
MARIE L. RIVIERE
BY
ATTORNEY

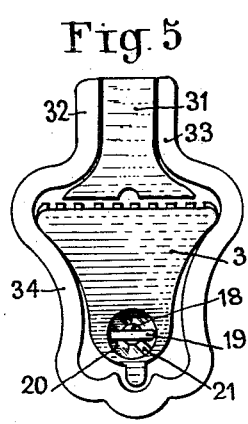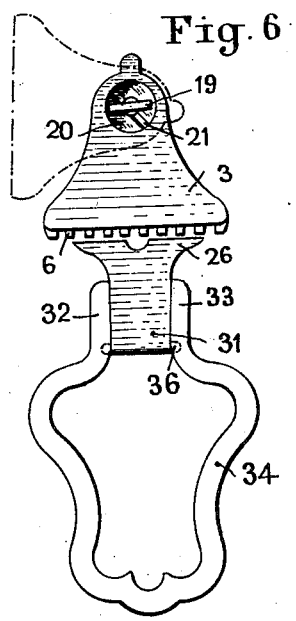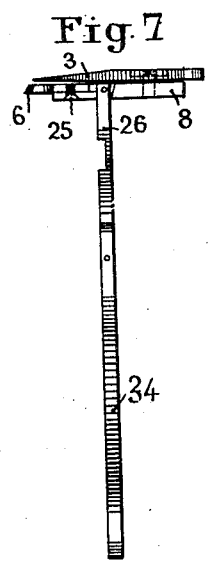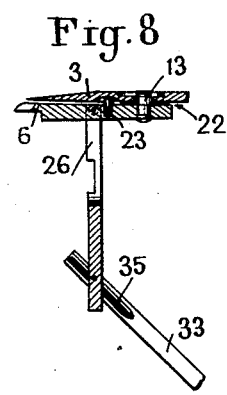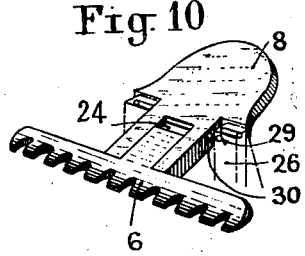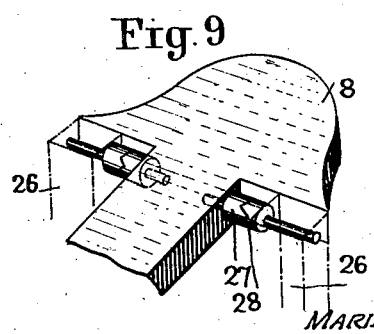

Feb. 3, 1931.  M. L. RIVIÉRE  1,791,428
FOLDING SAFETY RAZOR
Filed Aug. 24, 1927    4 Sheets-Sheet 3

INVENTOR
MARIE L. RIVIERE
BY
ATTORNEY

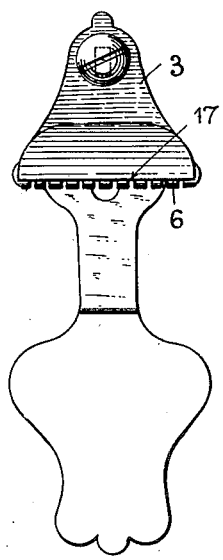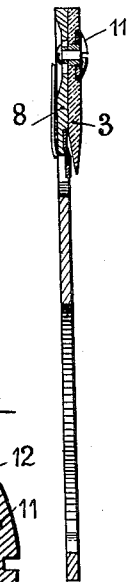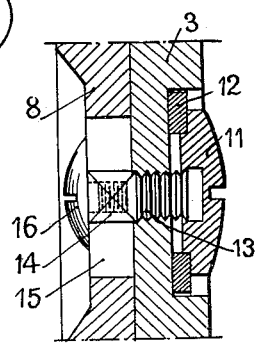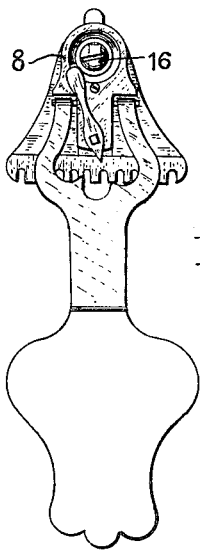

Patented Feb. 3, 1931

1,791,428

UNITED STATES PATENT OFFICE

MARIE LOUIS RIVIERE, OF PARIS, FRANCE

FOLDING SAFETY RAZOR

Application filed August 24, 1927, Serial No. 215,167, and in France September 30, 1926.

This invention relates to a folding safety razor an object of said invention relates more particularly to the combination, on a common folding or nonfolding support, of two suitably articulated blades or blade holders, in combination with a suitably adjustable cover which can be brought to cover and to protect the blade which is not in use, for the purpose of thus providing on a common support two blades of different kind of grinding and eventually of different nature which can be utilized for instance successively or alternately.

Another object of my said invention relates to the combination, of a blade of a suitable rigidity pivoted to a support to which it can be locked by means of suitable elastic stops, the said support being articulated between the elastic branches or prongs of an intermediate fork mounted between the branches of a stirrup shaped bracket constituting the handle of the razor so that it is possible, for the position in which the razor is not to be used, to fold all the elements of the razor into the bracket constituting the handle, whilst the blade can be nevertheless brought into the stropping position on the handle itself, so that a small and handy unit is obtained.

Another object of said invention relates to a razor according to said invention comprising an adjustment device combined with the comb shaped cover of one of the blades or of each of the blades, so as to enable the distance of the said guard relatively to the corresponding blade, to be varied for the purpose of adapting the razor to the different conditions of working. On the other hand, the guard intended to cover the blade or blades could constitute the handle of the razor.

Another object of said invention relates to a construction of a razor of that kind, in which the pivot pin of the blade, securing the said blade to its safety guard, is mounted so that it can slide in the seat of the guard, so as to make it possible to regulate with precision at any moment the position of the blade relatively to the guard, for the purpose of making up for the wear of the blade which may have been caused by repeated sharpening.

Figure 1:
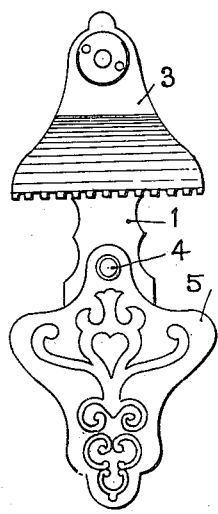
Figure 2:
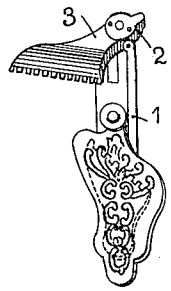
Figure 4:
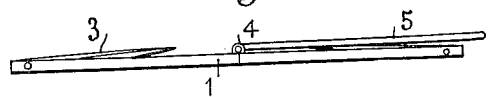
Figure 3:
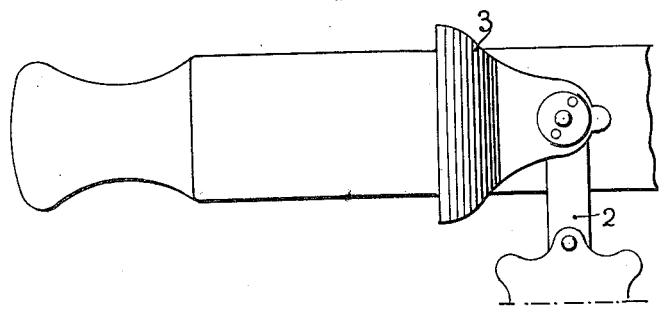

In the accompanying drawing which shows by way of example preferred forms of construction according to the invention:

Fig. 1 is a general view of the razor folded,

Fig. 2 is a perspective view showing the razor in the position of use of one of the blades, Fig. 3 shows the razor in the position for sharpening one of the blades, Fig. 4 is a diagrammatic elevation of a modified construction, Fig. 5 is a general view of the razor closed, Fig. 6 shows the razor of Fig. 5 unfolded, the blade not being yet however in the position of use, Fig. 7 is a side elevation of the said razor ready for use, Fig. 8 is a section of Fig. 7 during the folding of the elements, Figs. 9 and 10 show two constructions of the joint or articulation of the blade holder fork on the support of the blade.

Figure 11:
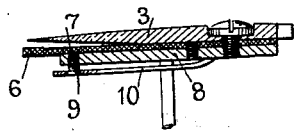
Figure 12:
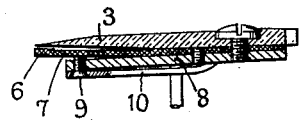
Figure 13:
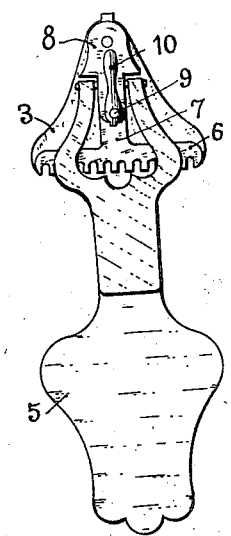
Figure 14:
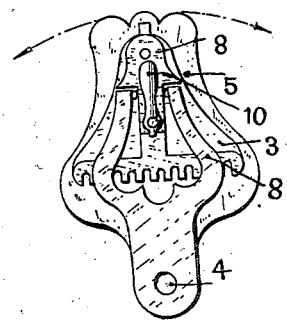
Figure 15:
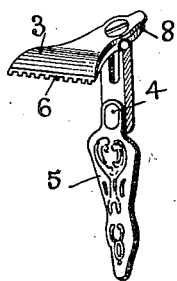

Fig. 11 is a central longitudinal section of a blade and of its guard fittings,

Fig. 12 is a view similar to Fig. 11, showing the comb shaped cover in a different position, Fig. 13 is a general view of the razor of Figs. 11 and 12 looking from the back, Figs. 14 and 15 show by way of modification, respectively in rear elevation in folded position, and in perspective in the position of use, a razor with a single blade, Fig. 16 is a front view of the whole razor, Fig. 17 is a rear view, Fig. 18 a longitudinal section, of a modification of the razor provided with a regulating device for the blade, Fig. 19 is a section on an enlarged scale of the head of the razor.

In the constructional form of Figs. 1 to 4, the razor comprises a common support or handle 1, to each of the ends of which is articulated a blade holder 2 with a blade 3, each of the units constituted by a blade and its blade holder being preferably of the construction described in the French Patent No. 460,293 of the 1st October 1912 in the name of the same inventor, each of these units, blade holder 2 and blade 3, being mounted on a transverse joint which enables it to be turned down along the handle 1 as in Figure 1, or opened at right angles to the said handle in the position of use, whilst on the other hand the blade 3 can pivot about the spindle or pin connecting it to the blade holder 2 for the purpose of sharpening it, as indicated in Fig. 3.

On a spindle or pin 4 situated half way between the points of articulation of the two blades 3, is articulated a cover 5 of a suitable shape provided with any suitable chiselling or ornamentation and arranged in such a manner that by pivoting it about the pin 4, it can be brought to cover either one or the other of the blades 3. The said blades could be of similar construction or suitably different, one of the two blades being for instance thinner and comprising a more flexible cutting edge, owing to which different operations can be performed with the same apparatus.

When the razor is to be used, the guard 5 is brought by rotation of its pin 4 on to the blade 3 which is not to be used, whilst the blade 3 which is to be used, is brought into a position at right angles to the handle 1 as shown in Figure 2.

In order to use this blade, the razor is held with the handle 1, utilizing if desired for this purpose the guard 2 which thus plays the double part of blade guard and of protector for the blade when not in use. It thus protects the said blade in use from any deterioration, and at the same time prevents the user from cutting himself by this blade.

The handle 1 could be provided, or not, about its centre with a transverse hinge which would allow it to be folded so as to reduce its dimensions. The guard 5 could be mounted on a hinge, the pin of which would be in the plane of Figure 1, transversely of the handle. In such a case, the same pin 4 could be utilized for the guard 5 and for the folding of the handle 1. Figure 4 shows by way of example a diagrammatic construction of an arrangment of that kind. It goes without saying that an elastic holding device could be provided so as to ensure the straight position of the handle in the position of use.

The cover 5 could also be constituted by two elements which could be folded against each other.

This cover could be made of any suitable material preferably having a suitable rigidity.

The blade 3 of the razor has a thick head mounted so that it can pivot on a pin 18 (Figs. 5 to 8) secured in any suitable manner to a support 8. The pin 18 is secured to a cross bar 19 intended to be placed in a circular recess 20 of the head of the blade 3, through which recess passes another recess or notch 21 for the passage of the cross bar 19.

A spring 22 of any suitable kind is inserted between the blade 3 and its support 8 (Fig. 8) in order to hold the said blade in a suitable position.

The suitable orientation of the blade 3 relatively to the support 8, is determined by a spring controlled nipple 23 (Fig. 8) mounted in the support 8 and engaging with a suitable recess in the said blade 3 which is thus locked in the position of use shown in Figures 5 to 7.

In order to enable the blade to be sharpened, it can be turned so as to be brought into the position shown in chain dotted lines in Figure 6, as described in my prior Patent No. 460,293. The blade 3 is provided under its bottom face with a second recess enabling the said stropping position to be produced and secured.

For providing a remedy against the wearing out of the blade by frequent stropping, the "comb" or guard 6 (Figures 7 to 9) is preferably mounted so that it can slide in a recess 24 of the support 8 and be held in the desired position by means of a screw 25. It is also possible to replace this construction by an eccentric or other control.

The support 8 is pivoted to the ends of a fork 26 and can be held relatively to the said fork in the two positions of rest or of utilization of Figures 7 and 8, by means of teeth 27—28 engaging with each other (Figure 9) or also by means of nipples 29—30 secured respectively to the fork 26 and to the head 8 (Figure 10) by utilizing in both cases the elasticity of the branches of the fork 26 for holding the head 8 in correct position.

The fork 26 is articulated with its tail 31 between the branches 32—33 of a stirrup shaped bracket 34 constituting the handle and intended, in the closing position, to receive in its interior the whole unit constituted by the fork 26, support 8 and blade 3, as shown in Figure 5. The edges of the tail 31 are preferably chamfered so as to fit into corresponding recesses 35 (Figure 8) provided in the arms 32—33 of the bracket 34 in the well known manner, so as to ensure suitable locking of the elements in the position given to them. In order to determine with greater precision the direction of folding of the various parts, stops will be preferably provided on the tail 31, for instance as shown in dotted lines at 36 (Fig. 6).

The working is obvious and identical with that of the razor forming the subject of my said Patent No. 460,293. The arrangement described makes possible an easy and quick dismantling of the various elements of the razor, thus ensuring keeping in good condition these various elements.

The invention is applicable whatever be the shape and the dimensions of the blade 3, and whether the razor have one or more blades.

As will be seen in Figures 11 and 12, the safety guard 6 of the razor is secured to an elastic support or arm 7 secured by screws or otherwise to the articulated blade holder 8, the arrangement being such that the elasticity of the arm 7 always tends to press the said arm exactly against the blade holder 8.

Near the end of the blade holder 8 is arranged a movable stop 9 constituted for instance by a pin engaging with a perforation of the blade holder 8 and provided with a screw-thread of very large pitch, and this stop is secured to an arm 10 which extends along the blade holder 8 and can be locked in position on the latter by a suitable stop device not shown.

This arrangement enables the blade holder 6 to be given the position of Figure 11 or the position of Figure 12, by a simple movement of the arm 10. It will be possible therefore even whilst using the razor, to vary according to the requirements the distance between the end or the cutting edge of the blade 3 and the safety guard 6, in order to obtain a sharper action of the blade.

The elastic arm 7 which is shown in the drawing as being fixed to the blade holder 8 by means of screws, could also be riveted to it or soldered or held in any other suitable manner. The movable stop 9 could be provided with any desired operating part, with a milled button or other means, a graduation being provided if desired opposite the operating part so as to enable the distance separating the blade from its guard to be determined at the very moment of the operation.

This arrangement could be utilized for razors with two blades, as well as for razors with a single blade, as it makes it possible to obtain different work with one and same blade. This single blade razor could be constituted by a single section of the razor in which case the guard 5 could constitute the handle of the razor for the position of use, as shown for instance in Figures 13 and 15. This arrangement would make it possible to hold the blade 3 in the position of rest, between the blade holder 8 and the guard 5, as shown in Figure 14, so that this blade would be held in a perfectly safe manner, protected from any outside contact, and the width of the razor would be still further reduced. In the case of its application to a single blade razor, the guard 5 could either be mounted on a pivot pin 4 as above described or connected to the blade holder by a hinge. This guard could also be duplicated or formed by two shells which, for the position of rest, would engage with the upper and lower faces of the whole constituted by the blade and the blade holder.

In the constructions formed according to Figs. 16 to 19, the blade 3 is held on its support 8 constituting the guard, by a nut 11 pressing against the said blade 3 through an elastic washer 12 and screwed on the end of a screw-threaded pin 13. The pin 13 has a square or rectangular portion 14 mounted in an elongated slot 15 of the blade holder support 8. The pin 13—14 can thus slide in the slot 15 and be locked in any desired position in the said slot by means of a screw 16 which is screwed on the square head 14 and the head of which rests on the blade holder 8, as shown more particularly in Fig. 17.

Owing to this arrangement, it is possible, by unscrewing the screw 16, to slide the head 14 in the groove or slot 15 so as to bring the end of the guard 6 nearer to the cutting edge 17 (Fig. 16) of the blade 3, so as to make up for any wear of the blade caused by successive grinding.

The head 16 could be integral with the screwthreaded pin 13—14 in which case the blade could be locked in the desired position simply by tightening the nut 11.

The slot 15 instead of being provided in the head 8, could also be provided in the blade 3, the adjustment being then effected by sliding this blade on its pin 13—14.

The nut 11 could also be arranged on the rear face of the blade holder 8, in which case the screw-threaded pin 13—14 could be integral with the blade 3 or provided with a head engaging with a suitable recess provided in the said blade.

What I claim is:

In a folding safety razor, a support, a blade having a thick head provided with a circular recess having a slot in its bottom and a pin pivoting the blade to the support, said pin being secured to the support and provided at its end with a cross bar, said bar being passed through the slot of the recess to lie in the recess and then turned out of alignment with said slot, and a spring between the support and blade.

In testimony whereof I have hereunto set my hand.

MARIE LOUIS RIVIÉRE.